UNITED STATES PATENT OFFICE.

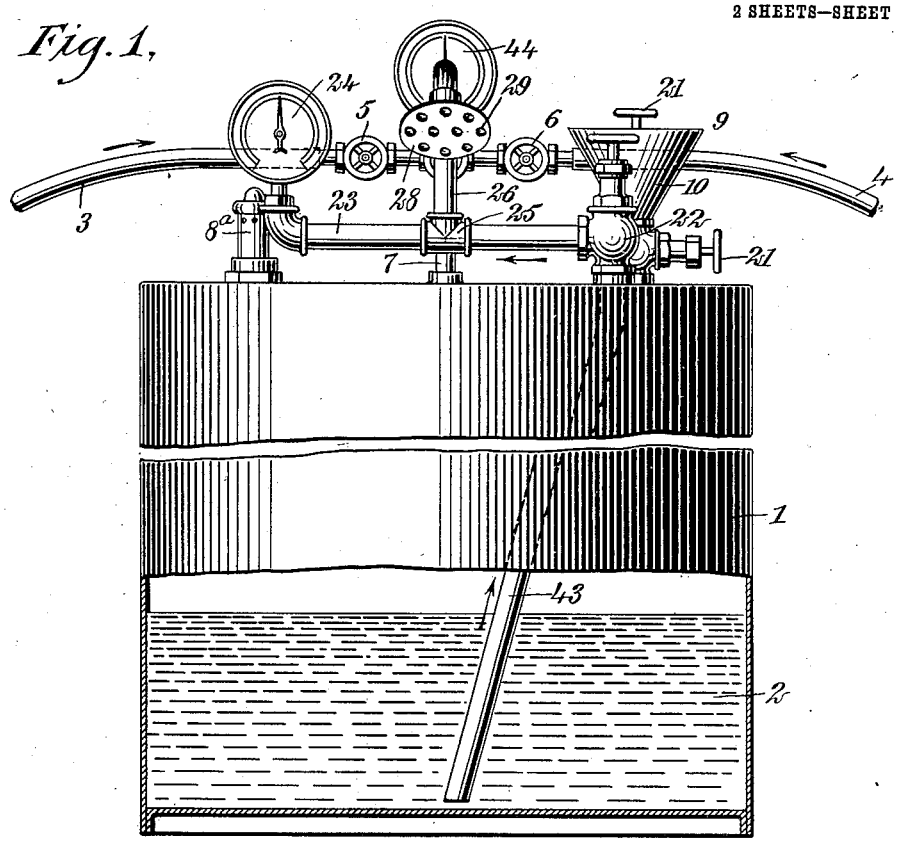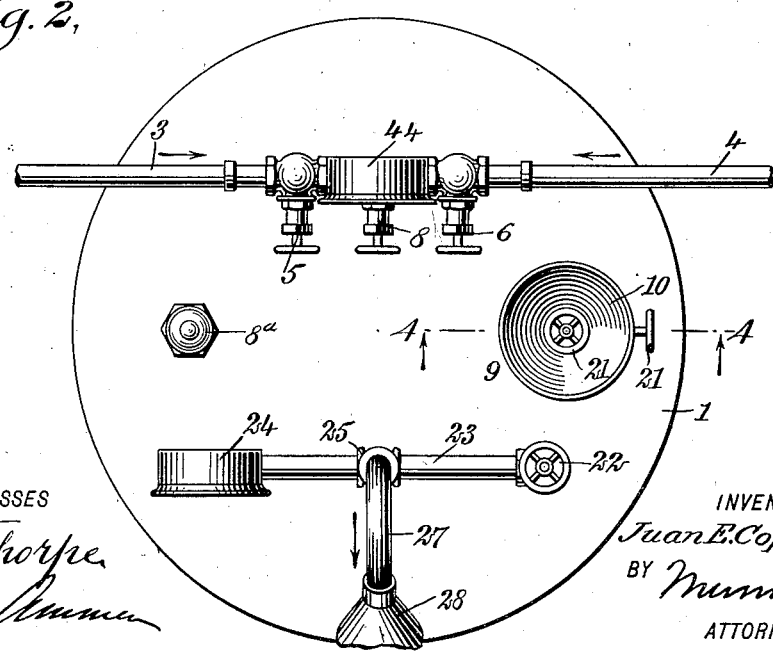

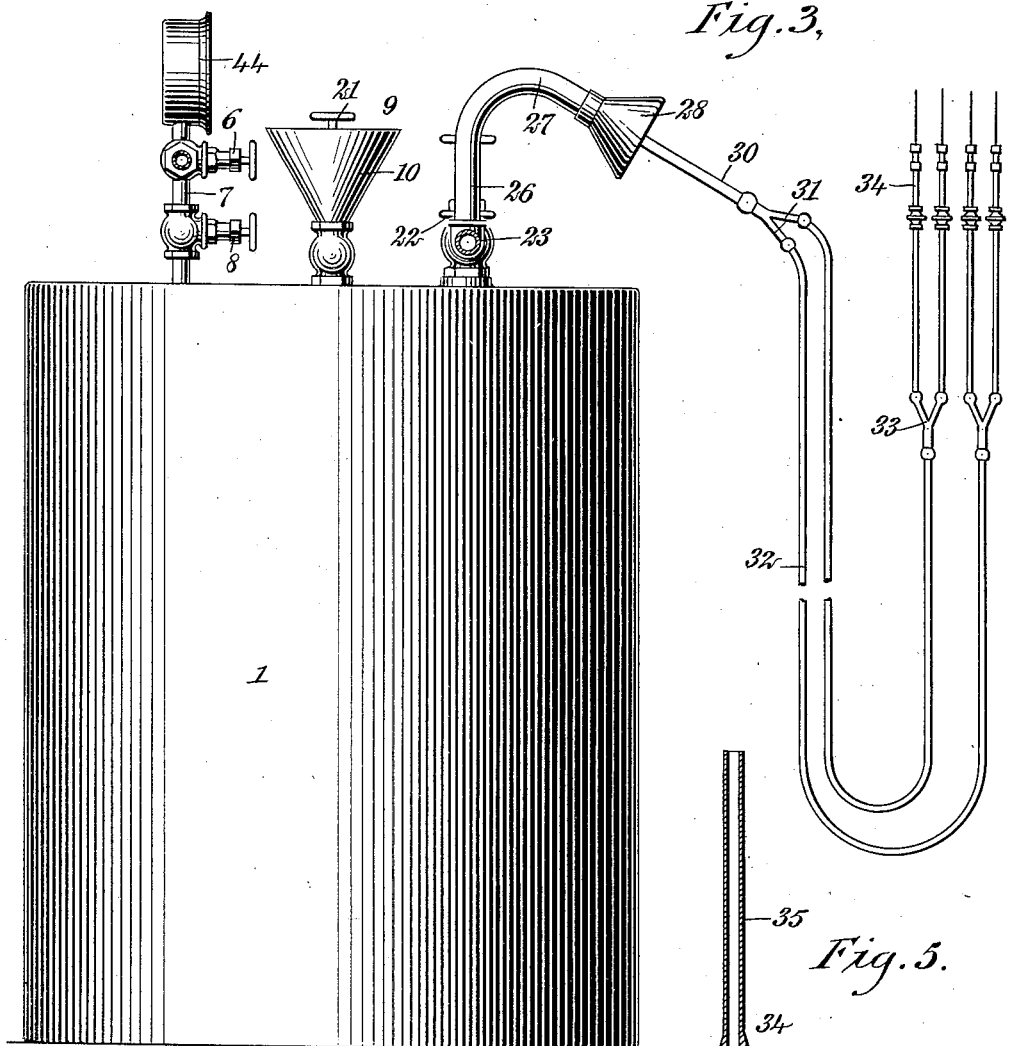
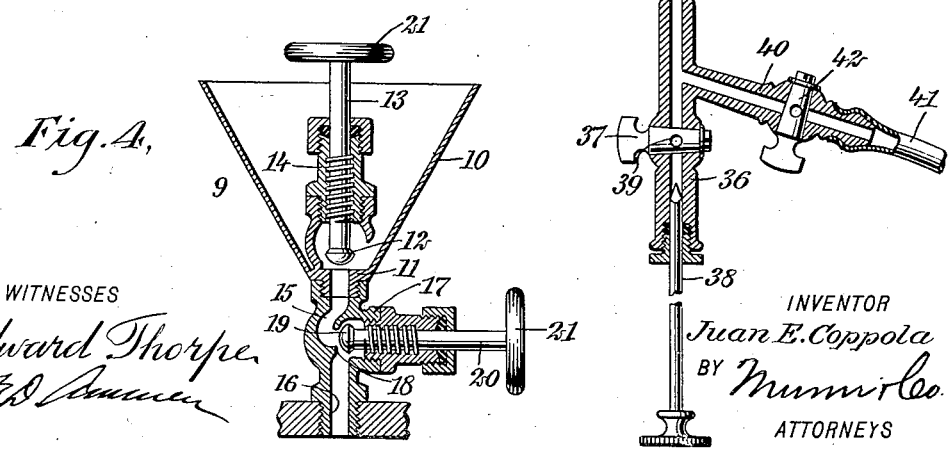

JUAN E. COPPOLA, OF MEXICO, MEXICO.

EMBALMING APPARATUS.

935,839.  Specification of Letters Patent.  Patented Oct. 5, 1909.

Application filed December 23, 1908. Serial No. 468,919.

*To all whom it may concern:*

Be it known that I, JUAN E. COPPOLA, a subject of the King of Italy, and a resident of the city of Mexico, Mexico, have invented a new and Improved Embalming Apparatus, of which the following is a full, clear, and exact description.

This invention relates to apparatus for embalming bodies.

An object of the invention is to provide a simple apparatus of this kind capable of holding the liquid and compressed air in a reservoir, and devices for connecting the same with trocars or needles for injecting the fluid under pressure into a cadaver.

A further object of the invention is to provide means for introducing quantities of embalming fluid into the reservoir while maintaining the pressure.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a front elevation of the apparatus, a portion of which is broken away and shown in cross section; Fig. 2 is a plan of the apparatus shown in Fig. 1; Fig. 3 is a side elevation of the apparatus and showing the trocars in connection therewith; Fig. 4 is a vertical section on the line 4—4 of Fig. 2 and upon an enlarged scale; and Fig. 5 is a section through one of the trocars.

Referring more particularly to the parts, 1 represents a reservoir or tank which is partially filled with an embalming fluid 2. This tank may be charged with a fluid or with compressed air through supply pipes 3 and 4 which are provided respectively with valves 5 and 6, as indicated. These pipes 3 and 4 connect with a main inlet pipe 7 which leads through the cover into the tank, and this pipe 7 is provided with a valve 8 through which the compressed air or embalming fluid is admitted. The cover of the tank is provided near one side with a relief valve or safety valve 8ª, of any suitable form. If the pressure rises above a dangerous point this valve will rise from its seat and allow some of the compressed air to escape.

Opposite to the relief valve 8ª, as indicated in Fig. 2, I provide a charging device 9, the details of the construction of which are indicated in Fig. 4. This device enables small quantities of chemicals or fluids to be introduced to the interior of the tank or reservoir without cutting off the pressure. In its general construction this charging device comprises a funnel 10, in the lower part of which a valve seat 11 is formed. Upon this valve seat 11 a valve is adapted to seat, the said valve consisting of an enlarged head 12 formed at the lower end of a stem 13, the stem being threaded and mounted in a suitable guide 14, as shown. From the seat 11 there is provided a duct 15, which extends downwardly into a tubular nipple 16 which is screwed into the cover of the tank. This duct 15 is formed through a valve body 17, in which is provided a valve seat 18 for a valve 19 formed at the inner end of a stem 20. The valve stems 13 and 20 are provided with suitable hand wheels 21, by means of which the valves may be closed when desired. When it is desired to introduce chemicals or a fluid into the interior of the reservoir, the valve 19 will be first seated tightly on the seat 18, the chemicals will then be poured into the funnel 10 and will pass down into the duct 15 below the valve 12, the valve 12 is then closed tightly and the valve 19 opened; this will permit the chemicals to pass down into the interior of the tank without permitting the escape of any compressed air, that is, without a reduction of the pressure existing in the tank.

Near the front of the reservoir the cover of the reservoir is provided with an elbow valve 22, from which a horizontal pipe connection 23 extends. The end of this pipe connection is provided with a gage 24 which indicates the pressure existing within the reservoir. On the pipe 23 a tee connection 25 is provided, from which a delivery pipe 26 extends upwardly, the upper end of this pipe 26 being formed into a gooseneck 27, to the end of which a conical bell or head 28 is attached. This bell 28 is provided on its forward flat face with a plurality of openings or sockets 29. These sockets are adapted to receive the ends of nozzle tubes 30. These nozzle tubes are simply set tightly into position, as shown, and each nozzle tube is provided with two branches 31. To each of the branches 31, flexible tubes 32 are attached.

The ends of the tubes 32 are attached to Y's 33, and the branches of these Y's 33 have trocars 34 attached thereto, as indicated.

The trocars are of the common form shown in Fig. 5, having a tubular body 35 with a tubular butt 36 having a stop cock 37 mounted therein. Through the tubular butt 36 a needle 38 slides, as shown. The stop cock 37 has a port 39 through which the needle 38 may slide when the stop cock is turned in a proper position. It should be understood that the needle 38 is advanced through this port 39 so that its point projects beyond the end of the tube 35, when the trocar is to be introduced into the flesh. At the side the body of the trocar is provided with inlet nipples 40, and these nipples are connected by flexible tubes 41 with the Y's 33. The inlet nipples 40 are provided with stop cocks 42 which may be turned to stop the flow of embalming fluid through the trocars. The valve 22 is connected with a riser pipe 43 which extends down into the interior of the reservoir and near the bottom thereof, as shown.

In the operation of the apparatus the sockets 29 are all occupied by the nozzle tubes 30, and as each nozzle tube is connected with four trocars, it will be seen that a great number of trocars can be operated by this one apparatus. The gage 24 enables the pressure to be watched carefully so that it does not rise above an efficient point. The inlet pipe or charging pipe 7, is surmounted by a gage 44 for indicating the pressure of the compressed air or embalming fluid which is being forced into the reservoir.

Having thus described my invention, I claim as new and desire to secure by Letters Patent,—

1. An apparatus of the class described, comprising a reservoir adapted to contain an embalming fluid, means for introducing compressed air into the upper part of said reservoir, a pipe leading from the lower part of said reservoir and adapted to lead off the embalming fluid, a valve for regulating the flow from said pipe, a plurality of trocars, and tubes connecting said trocars with said valve.

2. In an apparatus of the class described, in combination, a reservoir having an embalming fluid, a delivery pipe leading therefrom, a delivery head connected to said delivery pipe, a valve for regulating the flow through said delivery pipe, said delivery head having a plurality of sockets therein, a plurality of nozzle tubes received in said sockets, and a plurality of trocars connected with said nozzle tubes.

3. In an apparatus of the class described, in combination, a reservoir for an embalming fluid, means for admitting compressed air to the upper part of said reservoir, a delivery pipe leading from a low level in the interior of said reservoir, a conical head connected with said delivery pipe and having a plurality of sockets therein, a plurality of nozzle tubes received in said sockets, trocars, tubes connecting said trocars with said nozzle tubes, and a gage on said delivery pipe for indicating the pressure of the fluid flowing to said head.

4. A filling device for a reservoir of the class described, comprising a funnel having a duct leading therefrom to the interior of said reservoir, and a pair of valves disposed one below the other in said duct and adapted to be closed independently of each other.

5. A filling device for a reservoir of the class described, comprising a funnel having a valve seat in the lower part thereof, a guide, a valve mounted in said guide and adapted to come upon said seat to close the same, and a second valve between said first valve and said reservoir and adapted to be closed when said first valve is opened.

In testimony whereof I have signed my name to this specification in the presence of two subscribing witnesses.

JUAN E. COPPOLA.

Witnesses:
 José M. Addis,
 José Sanguineti.